(12) United States Patent
Nam et al.

(10) Patent No.: US 10,263,992 B2
(45) Date of Patent: Apr. 16, 2019

(54) METHOD FOR PROVIDING BROWSER USING BROWSER PROCESSES SEPARATED FOR RESPECTIVE ACCESS PRIVILEGES AND APPARATUS USING THE SAME

(71) Applicant: ELECTRONICS AND TELECOMMUNICATIONS RESEARCH INSTITUTE, Daejeon (KR)

(72) Inventors: Taeho Nam, Geoje-si (KR); Seung-hun Han, Daejeon (KR); Jung-hwan Kang, Boryeong-si (KR); Wook Shin, Daejeon (KR); HyoungChun Kim, Daejeon (KR); ByungJoon Kim, Daejeon (KR); Sung-Jin Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 15/213,556

(22) Filed: Jul. 19, 2016

(65) Prior Publication Data

US 2017/0244714 A1 Aug. 24, 2017

(30) Foreign Application Priority Data

Feb. 23, 2016 (KR) ........................ 10-2016-0021217

(51) Int. Cl.
*H04L 29/06* (2006.01)
*G06F 16/9535* (2019.01)
*G06F 21/55* (2013.01)

(52) U.S. Cl.
CPC ........ *H04L 63/101* (2013.01); *G06F 16/9535* (2019.01); *G06F 21/55* (2013.01);
(Continued)

(58) Field of Classification Search
CPC ..... H04L 63/101; H04L 63/08; H04L 63/105; H04L 63/168; G06F 17/30867
(Continued)

(56) References Cited

U.S. PATENT DOCUMENTS

| 8,935,798 B1 * | 1/2015 | Smith | ............ | G06F 17/30902 |
| | | | | 709/219 |
| 9,002,808 B1 * | 4/2015 | Liu | ............ | G06F 3/048 |
| | | | | 707/694 |

(Continued)

FOREIGN PATENT DOCUMENTS

| KR | 10-2011-0125698 A | 11/2011 |
| KR | 10-2012-0131742 A | 12/2012 |

(Continued)

OTHER PUBLICATIONS

Grier, Chris, Shuo Tang, and Samuel T. King. "Secure web browsing with the OP web browser." Security and Privacy, 2008. SP 2008. IEEE Symposium on. IEEE, 2008.*
(Continued)

*Primary Examiner* — Syed A Zaidi
(74) *Attorney, Agent, or Firm* — LRK Patent Law Firm

(57) ABSTRACT

A method for providing a browser using browser processes separated based on access privileges and an apparatus using the method. The method includes acquiring a first address corresponding to a first webpage; acquiring a first set of terminal access privileges based on the first address from a privilege control list and executing a first browser process corresponding to the first set of terminal access privileges; determining whether to allow rendering by comparing the first set of terminal access privileges with a second set of terminal access privileges corresponding to a second webpage when the first browser process attempts to render the second webpage; and if the rendering is not allowed, blocking the first browser process from rendering and rendering
(Continued)

the second webpage by executing a second browser process corresponding to the second set of terminal access privileges.

13 Claims, 9 Drawing Sheets

(52) U.S. Cl.
CPC ............ H04L 63/08 (2013.01); H04L 63/105 (2013.01); H04L 63/168 (2013.01)

(58) Field of Classification Search
USPC .......................................................... 726/4
See application file for complete search history.

(56) References Cited

U.S. PATENT DOCUMENTS

| | | | | |
|---|---|---|---|---|
| 9,686,264 | B2* | 6/2017 | Banno ..................... | H04L 63/08 |
| 9,742,789 | B2* | 8/2017 | Ding ................... | H04L 63/1425 |
| 2009/0290193 | A1* | 11/2009 | Ohba ...................... | G06F 21/10 |
| | | | | 358/1.15 |
| 2010/0241755 | A1* | 9/2010 | Bassett .................. | G06Q 10/06 |
| | | | | 709/229 |
| 2010/0281537 | A1* | 11/2010 | Wang ..................... | G06F 9/468 |
| | | | | 726/22 |
| 2013/0047216 | A1* | 2/2013 | Ajitomi ................... | G06F 9/541 |
| | | | | 726/4 |
| 2013/0067541 | A1 | 3/2013 | Itoh et al. | |
| 2016/0094534 | A1* | 3/2016 | Banno ..................... | H04L 63/08 |
| | | | | 726/4 |
| 2016/0241905 | A1 | 8/2016 | Gao et al. | |

FOREIGN PATENT DOCUMENTS

| | | |
|---|---|---|
| KR | 10-2013-0067690 A | 6/2013 |
| KR | 10-2015-0048660 A | 5/2015 |
| WO | 2012/161526 A1 | 11/2012 |

OTHER PUBLICATIONS

Reis, Charles, and Steven D. Gribble. "Isolating web programs in modern browser architectures." Proceedings of the 4th ACM European conference on Computer systems. ACM, 2009.*
Samuel, Justin, and Beichuan Zhang. "RequestPolicy: Increasing web browsing privacy through control of cross-site requests." International Symposium on Privacy Enhancing Technologies Symposium. Springer, Berlin, Heidelberg, 2009.*
Singh, Ashish Kumar, and Vidyasagar Potdar. "Blocking online advertising—A state of the art." Industrial Technology, 2009. ICIT 2009. IEEE International Conference on. IEEE, 2009.*
Eric Y. Chen et al., "App Isolation: Get the Security of Multiple Browsers with Just One", CCS, Oct. 2011.

* cited by examiner

METHOD FOR PROVIDING BROWSER
USING BROWSER PROCESSES SEPARATED
FOR RESPECTIVE ACCESS PRIVILEGES
AND APPARATUS USING THE SAME

CROSS REFERENCE TO RELATED
APPLICATION

This application claims the benefit of Korean Patent Application No. 10-2016-0021217, filed Feb. 23, 2016, which is hereby incorporated by reference in its entirety into this application.

BACKGROUND OF THE INVENTION

1. Technical Field

The present invention relates generally to technology for providing a browser process based on respective access privileges. More particularly, the present invention relates to a method for providing a browser using browser processes separated based on access privileges and an apparatus using the method, in which access privileges are granted to respective webpages based on a variable degree of reliability, and each webpage may access the resources of a terminal using a browser process that matches the access privileges granted to the webpage.

2. Description of the Related Art

When a user requests a browsing application (hereinafter, browser) to connect to a certain webpage, it is necessary to interpret the corresponding webpage and decode images so as to be displayed on the screen. This work is called rendering. A rendering engine, such as Blink or WebKit, is a software module for providing functions that are required for rendering, and is a main component of a browser.

The latest browsers, such as Chrome and Safari, have a multi-process architecture in order to enable a user to concurrently connect to multiple webpages. Specifically, each webpage is processed and displayed on a different tab, and to this end, a browser may create multiple tabs at the same time and allocate a process for processing the webpage on each of the tabs. Here, the process for processing a webpage on each tab is called a renderer process.

A renderer process performs all operations that are necessary for rendering a webpage, such as parsing Hyper Text Markup Language (HTML) documents and Cascading Style Sheet (CSS) documents, parsing and executing JavaScript, decoding images, and the like. Meanwhile, multiple renderer processes share a single browser process, and this browser process provides functions such as downloading of resources over networks and services that include a history of visited websites, cookies, clipboards, and the like.

However, a browser configured with multiple renderer processes and a single browser process may be weak in security. For example, if a browser concurrently connects to both a webpage having sensitive information and a webpage that may spread malicious code, a single browser process may manage all of the information from the different webpages. In this case, if a hacker gains a privilege for controlling the renderer process and browser process for processing the webpage through the webpage vulnerable to attacks, the sensitive information may be leaked.

These days, not only banking operations and company business but also services such as cloud services and social networking services are provided through web browsers. Because these operations and services handle sensitive information such as authentication information, if such information is leaked, the damage may be very serious.

Currently, a method by which web attacks such as Cross-Site Scripting (XSS) and Cross-Site Request Forgery (CSRF) are prevented is actively being researched. However, in order to resolve the above-mentioned problems, it is also necessary to research and develop technology for enhancing the security of a web browser itself.

In connection with this, Korean Patent Application Publication No. 10-2011-0125698, discloses a technology related to "Security providing method and device for execution of mobile web application."

SUMMARY OF THE INVENTION

An object of the present invention is to block a web attack on an entire browser by separating browser processes and to prevent damage from spreading to other processes even if a certain browser process is infected by malware.

Another object is to perform terminal access control for each webpage by granting a different set of terminal access privileges to each browser process and to prevent damage caused by a privilege escalation attack of malware.

In order to accomplish the above object, a method for providing a browser using browser processes separated based on access privileges according to the present invention includes acquiring a first address corresponding to a first webpage to which a user of a terminal intends to connect; acquiring a first set of terminal access privileges corresponding to the first webpage based on the first address from a privilege control list, and executing a first browser process corresponding to the first set of terminal access privileges; determining whether to allow rendering by comparing the first set of terminal access privileges with a second set of terminal access privileges corresponding to a second webpage when the first browser process attempts to render the second webpage; and if the rendering is not allowed, blocking the first browser process from rendering and rendering the second webpage by executing a second browser process corresponding to the second set of terminal access privileges.

Determining whether to allow the rendering may be configured not to allow the rendering if the first set of terminal access privileges is not identical to the second set of terminal access privileges.

Rendering the second webpage may be configured to render the second webpage using at least one of the first browser process and a first renderer process corresponding to the first browser process when the rendering is allowed because the first set of terminal access privileges is identical to the second set of terminal access privileges.

Rendering the second webpage may include determining whether there is a third browser process that is being executed to correspond to the second set of terminal access privileges before executing the second browser process; and if there is the third browser process, rendering the second webpage using the third browser process rather than by executing the second browser process.

Determining whether there is the third browser process may be configured to determine that there is the third browser process if an identifier of a browser process corresponding to the second set of terminal access privileges is confirmed by a terminal control module, which manages states of all browser processes.

Executing the first browser process may include dividing the first address into detailed items corresponding to at least one of a scheme, a domain name, a port number, a path, and a file name; and acquiring the first set of terminal access privileges corresponding to a User Identifier (UID) format by sending a query that includes the detailed items to the privilege control list.

The method may further include creating the privilege control list by acquiring a list, in which each set of the terminal access privileges is set based on a combination of the detailed items, from a management server.

The method may further include updating the privilege control list by acquiring a new list, in which each set of the terminal access privileges is changed, from the management server.

Creating the privilege control list may be configured to perform authentication based on a signature included in the list and to create the privilege control list by processing the list in a form of a data structure if the authentication succeeds.

The method may further include storing the new list in a tampering prevention module and preventing falsification of the privilege control list by monitoring the privilege control list based on the new list stored in the tampering prevention module.

The method may further include monitoring, by the terminal control module, at least one of all the browser processes and renderer processes corresponding to all the browser processes based on at least one of the terminal access privileges included in the privilege control list and a policy in which an access rule corresponding to a resource of the terminal is specified; and blocking, by the terminal control module, at least one of unintended process privilege escalation and an attempt to access the resource of the terminal, which violates the policy, through the monitoring.

The terminal control module may keep at least one piece of information between a process identifier and terminal access privileges, which correspond to each of all the browser processes, up-to-date, and may provide information about a browser process having certain terminal access privileges.

Acquiring the first address may be configured to acquire the first address using at least one of a method in which the first address that the user enters in an address field of a web browser is acquired and a method in which the first address is acquired from a web resource clicked by the user in a file system.

An apparatus for providing a browser using browser processes separated based on access privileges according to an embodiment of the present invention includes an address acquisition unit for acquiring a first address corresponding to a first webpage to which a user of a terminal intends to connect; a privilege control unit for acquiring a first set of terminal access privileges corresponding to the first webpage based on the first address from a privilege control list and determining whether to allow rendering by comparing the first set of terminal access privileges with a second set of terminal access privileges corresponding to a second webpage when a first browser process corresponding to the first set of terminal access privileges attempts to render the second webpage; and a browser execution unit for connecting to the first webpage by executing the first browser process, and if the rendering is not allowed, for blocking the first browser process from rendering and then rendering the second webpage by executing a second browser process corresponding to the second set of terminal access privileges.

The privilege control unit may not allow the rendering if the first set of terminal access privileges is not identical to the second set of terminal access privileges.

The browser execution unit may render the second webpage using any one of the first browser process and a first renderer process corresponding to the first browser process if the rendering is allowed because the first set of terminal access privileges is identical to the second set of terminal access privileges.

The browser execution unit may be configured to determine whether there is a third browser process that is being executed to correspond to the second set of terminal access privileges before executing the second browser process, and if there is the third browser process, to render the second webpage using the third browser process rather than by executing the second browser process.

The apparatus may further include a terminal control unit for managing and retaining states of all browser processes, and the browser execution unit may determine that there is the third browser process when confirming an identifier of a browser process corresponding to the second set of terminal access privileges, the identifier being acquired from the terminal control unit.

The privilege control unit may be configured to divide the first address into detailed items corresponding to at least one of a scheme, a domain name, a port number, a path, and a file name, and to acquire the first set of terminal access privileges corresponding to a User Identifier (UID) format by sending a query that includes the detailed items to the privilege control list.

The apparatus may further include a tampering prevention unit for creating the privilege control list by acquiring a list, in which each set of the terminal access privileges is set based on a combination of the detailed items, from a management server, and the tampering prevention unit may be configured to separately store the list in an internal storage module, and to prevent falsification of the privilege control list by monitoring the privilege control list based on the separately stored list.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
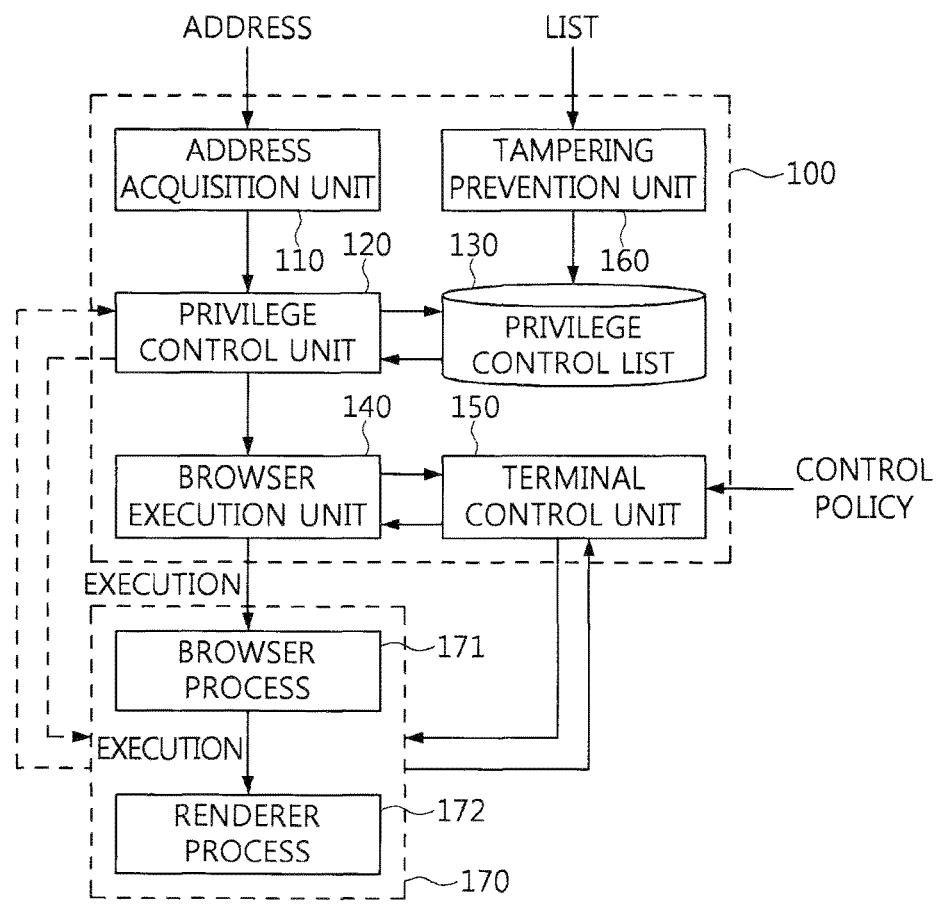
FIG. 1 is a block diagram illustrating an apparatus for providing a browser using browser processes separated based on access privileges according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram illustrating an apparatus for providing a browser using browser processes separated based on access privileges according to an embodiment of the present invention.

Referring to FIG. 1, the browser provision apparatus 100 using browser processes separated based on access privileges according to an embodiment of the present invention includes an address acquisition unit 110, a privilege control unit 120, a privilege control list 130, a browser execution unit 140, a terminal control unit 150, and a tampering prevention unit 160.

The address acquisition unit 110 may acquire a first address, which is the address of a first webpage to which the user of a terminal intends to connect. For example, an address that includes a scheme such as http or ftp, a port number, a domain name, a path, a file name, and the like may be acquired.

Here, the acquired address of the webpage may be used in order to determine the terminal access privileges corresponding to the webpage.

Here, the first address may be acquired using at least one of a method in the first address that a user enters in the address field of the web browser is acquired and a method in which the first address is acquired from a web resource, clicked by a user, in the file system.

In other words, both the address that the user directly enters in the address field of the web browser and the address of the web resource accessed by a user in the file system may be included in the scope of the address that can be acquired by the address acquisition unit 110.

Based on the first address, the privilege control unit 120 acquires a first set of terminal access privileges corresponding to the first webpage from the privilege control list 130. When a first browser process having the first set of terminal access privileges attempts to render a second webpage, the privilege control unit 120 may determine whether to allow rendering by comparing the first set of terminal access privileges with a second set of terminal access privileges corresponding to the second webpage.

In other words, the privilege control unit 120 may determine suitable terminal access privileges to be granted to the first address, received from the address acquisition unit 110, and may refer to the privilege control list 130 for the determination.

Here, the privilege control list 130 may be a database in which terminal access privileges are set based on an address of a website.

Accordingly, when the privilege control unit 120 delivers the first address to the privilege control list 130, the database corresponding to the privilege control list 130 is searched for the first set of terminal access privileges corresponding to the first address, and the found access privileges may be provided to the privilege control unit 120.

Here, the terminal access privileges may correspond to a User Identifier (UID) format. A UID is an identifier for identifying a user or process that accesses resources such as files in a Unix-like system, but the present invention may use an identifier other than the UID for distinguishing processes from each other.

Here, either the first browser process or a first renderer process corresponding to the first browser process may attempt to render the second webpage.

Here, the renderer process 172, which configures the browser 170 along with the browser process 171, may perform all operations necessary for rendering a webpage, such as parsing Hyper Text Markup Language (HTML) documents and Cascading Style Sheet (CSS) documents, parsing and executing JavaScript, decoding images, and the like.

Therefore, in order for the first renderer process to render the second webpage, the first renderer process also needs permission from the privilege control unit 120.

For example, if the first renderer process attempts to download web resources such as HTML, documents, CSS documents, images, JavaScript, and the like, in order to render the second webpage, the first renderer process can download them only when permission is obtained from the privilege control unit 120 based on the second set of terminal access privileges corresponding to the second webpage.

For another example, when a user clicks a link in the first webpage, the first browser process may also attempt to download the web resource associated with the link, that is, may attempt to render the second webpage. In this case, rendering may be performed only when permission is obtained from the privilege control unit 120 based on the second set of terminal access privileges corresponding to the second webpage. Unless this permission is obtained, the second webpage may be rendered by another process that has the second set of terminal access privileges.

Here, if the first set of terminal access privileges is not the same as the second set of terminal access privileges, rendering may not be allowed. That is, because the first browser process has the first set of terminal access privileges, the first browser process is permitted to render only a webpage having a set of terminal access privileges that is the same as the first set of terminal access privileges.

Here, the first address is divided into detailed items corresponding to at least one of a scheme, a domain name, a port number, a path, and a file name, and a query that includes the detailed items is delivered to the privilege control list 130, whereby the first set of terminal access privileges corresponding to a User Identifier (UID) format may be acquired.

Here, the privilege control list 130 may search for terminal access privileges suitable for the first address through various methods using the scheme, domain name, port number, path, and file name, included in the query.

For example, in order to process the query in the privilege control list 130, the terminal access privileges may be retained in the form of a data structure. In this case, when a query is received from the privilege control unit 120, suitable terminal access privileges may be searched for by traversing the data structure based on the detailed items included in the query.

The browser execution unit 140 may connect to the first webpage by executing the first browser process. Then, if the first browser process is not permitted to render the second webpage, the browser execution unit 140 may render the second webpage by executing a second browser process corresponding to the second set of terminal access privileges after blocking the first browser process from performing the rendering.

Specifically, in order to connect to the first webpage, the browser execution unit 140 may receive the first address and information about the first set of terminal access privileges from the privilege control unit 120. That is, in order to connect to the first address, the first browser process corresponding to the first set of terminal access privileges is executed first, and a connection to the first webpage may be made by entering the first address in the first browser process.

Here, if the first browser process is permitted to render the second webpage because the first set of terminal access privileges is the same as the second set of terminal access privileges, the second webpage may be rendered using any one of the first browser process and the first renderer process, which corresponds to the first browser process. That is, if the first set of terminal access privileges is the same as the second set of terminal access privileges, a connection to the second webpage may be made by entering the second address regardless of which to use the first browser process or the first renderer process.

In this case, before executing a second browser process, it is determined whether there is a third browser process, which is being executed to correspond to the second set of terminal access privileges. If there is such a third browser process, the second webpage may be rendered using the third browser process rather than by executing the second browser process.

For example, it is assumed that the first browser process having the first set of terminal access privileges and the third browser process having the second set of terminal access privileges, which is not the same as the first set of terminal access privileges, are being executed on the browser. In this case, if the first browser process attempts to render the second webpage having the second set of terminal access privileges, the privilege control unit 120 blocks the first browser process from performing the rendering, and may then deliver the address of the second webpage and the second set of terminal access privileges to the browser execution unit 140. Then, the browser execution unit 140 may render the second webpage using the third browser process, which has already been executed.

Also, in the above example, if only the first browser process, having the first set of terminal access privileges, is being executed on the browser, the browser execution unit 140 may render the second webpage by executing a second or third browser process corresponding to the second set of terminal access privileges.

Here, the terms "first", "second", "third", and the like are used merely to distinguish the browser processes executed on the browser from each other.

The terminal control unit 150 may manage and retain the states of all browser processes in real time. Here, all of the browser processes may be browser processes that are executed in the currently active browser, that is, in the browsing application, and executable browser processes.

Here, the terminal control unit 150 detects events such as execution, normal termination, and abnormal termination of browser processes that are executed in the browser, and thereby keeps information about the states of all the browser processes up to date.

Here, at least one of a process identifier and terminal access privileges of each of all the browser processes may be kept up-to-date, and information about a browser process having specific terminal access privileges may be provided.

Here, the browser execution unit 140 may determine that there is a third browser process when confirming the identifier of a browser process corresponding to the second set of terminal access privileges, which is acquired from the terminal control unit 150.

For example, the browser execution unit 140 may send the terminal control unit 150 a query that includes the second set of terminal access privileges, in order to check whether there is a third browser process corresponding to the second set of terminal access privileges. Here, the terminal control unit 150 acquires the information about the second set of terminal access privileges from the query, and may check the state of browser processes having the second set of terminal access privileges in the process state and information list. In this case, if it is determined that a third browser process having the second set of terminal access privileges is being executed, the process identifier of the third browser process is delivered to the browser execution unit 140 so as to indicate that the third browser process is currently being executed.

Also, in the above example, if no browser process having the second set of terminal access privileges is being executed, the terminal control unit 150 may provide the browser execution unit 140 with state information indicating that no browser process having the second set of terminal access privileges is running. Then, the browser execution unit 140 may execute a browser process corresponding to the second set of terminal access privileges based on the information received from the terminal control unit 150.

Also, the terminal control unit 150 monitors at least one of all the browser processes and renderer processes corresponding to all the browser processes based on at least one of the terminal access privileges included in the privilege control list 130 and a policy that specifies access rules corresponding to terminal resources, and may prevent at least one of unintended escalation of the process privileges and access to the terminal resources, which violates the policy.

Here, the policy may be a policy for controlling access to the resources of the terminal based on terminal access privileges. That is, the terminal control unit 150 receives an access control policy corresponding to terminal resources based on each set of terminal access privileges, and may apply the corresponding policy to the browser provision system according to the present invention.

Here, the terminal control unit 150 may receive the policy in various forms, such as eXtensible Markup Language (XML), JavaScript Object Notation (JSON), or the like, from a user or a management server. Also, the terminal control unit 150 may receive a policy that is encrypted or signed for security.

In this case, the terminal resources to which access can be controlled based on terminal access privileges through the policy may include at least one of a file system, a system call provided by an operating system, a removable memory device, an input device including a camera and a printer, a GPS device, a screen capture function, a clipboard function, a plug-in, and a function of executing a third-party application.

The tampering prevention unit 160 periodically checks whether the privilege control list 130 has been corrupted or falsified, and may create the privilege control list 130 by acquiring a list, in which respective terminal access privileges are set based on a combination of detailed items pertaining to the addresses of the web pages, from the management server.

Here, the tampering prevention unit 160 separately stores the list in the internal storage module thereof, and monitors the privilege control list 130 based on the separately stored list, whereby the privilege control list 130 may be prevented from being falsified.

For example, assuming that the interval for checking is set to time t, whenever an amount of time corresponding to t elapses, whether the privilege control list 130 is falsified may be checked by comparing the privilege control list 130 with the list stored in the internal storage module of the tampering prevention unit 160. If an unapproved attempt to change the list is detected in the privilege control list 130, the attempt may be blocked.

Here, authentication is performed based on the signature included in the list, and if the authentication succeeds, the list is processed so as to have the form of a data structure, whereby the privilege control list 130 may be created.

As described above, because a browser is provided to a user through the browser provision apparatus 100 according to the present invention, browser processes are separated, thus preventing a web attack on the entire browser. Also, even if a certain browser process is infected with malware, the damage may be prevented from spreading to other browser processes.

Also, terminal access control is performed based on each webpage by granting a different set of terminal access privileges to each browser process, whereby damage caused by a privilege escalation attack of malware may be prevented.

Figure 2:
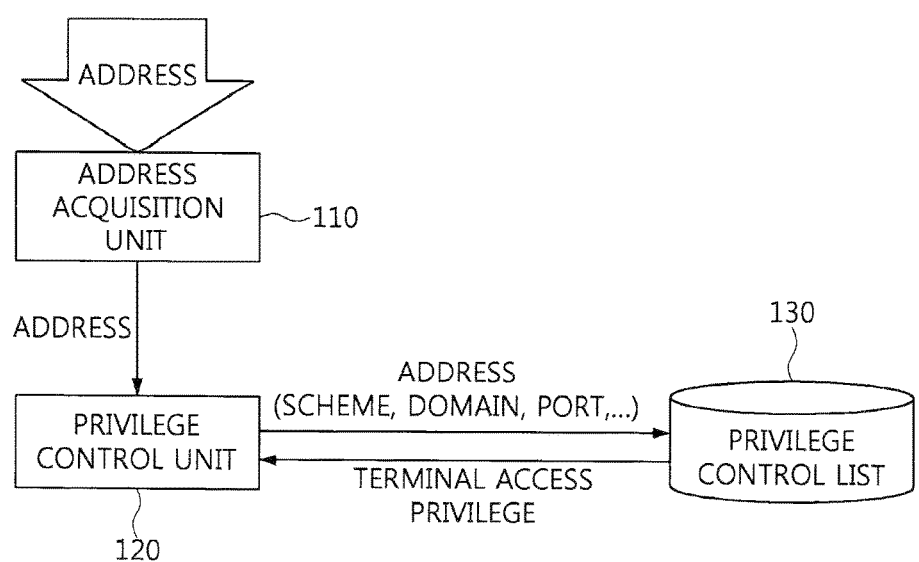
FIG. 2 is a block diagram illustrating an example of the relationship between the address acquisition unit, the privilege control unit, and the privilege control list, illustrated in FIG. 1.

FIG. 2 is a block diagram illustrating an example of the relationship between the address acquisition unit, the privilege control unit, and the privilege control list, illustrated in FIG. 1.

Referring to FIG. 2, the address acquisition unit 110 may acquire the address of a webpage to which a user wants to connect.

Then, the privilege control unit 120 receives the address of the webpage from the address acquisition unit 110, and may divide the received address into detailed items that include a scheme, a domain name, a port number, a path, a file name, and the like.

Then, the privilege control unit 120 may send a query, which includes some or all of the detailed items, to the privilege control list 130.

Here, the privilege control list 130 searches the internal data structure based on the detailed items included in the received query, and may provide the privilege control unit 120 with terminal access privileges to be granted to the webpage to which the user wants to connect.

Figure 3:
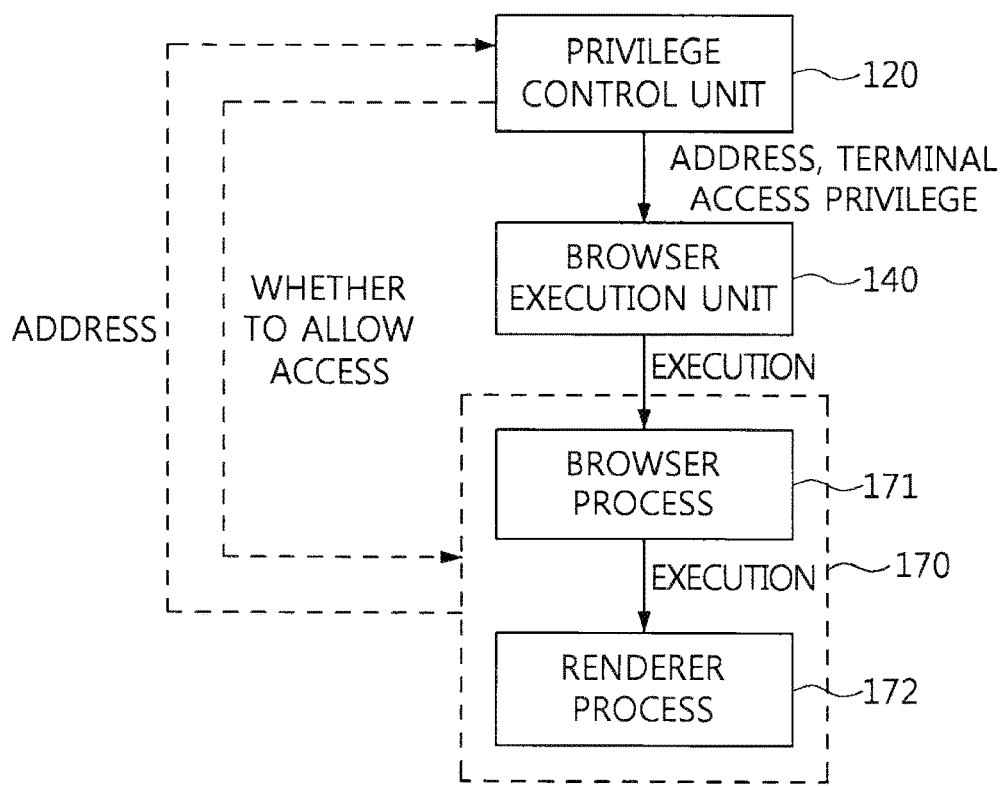
FIG. 3 is a block diagram illustrating an example of the relationship between the privilege control unit, the browser execution unit, and the browser, illustrated in FIG. 1.

FIG. 3 is a block diagram illustrating an example of the relationship between the privilege control unit, the browser execution unit, and the browser, illustrated in FIG. 1.

Referring to FIG. 3, the browser execution unit 140 may receive the address of a webpage that a user wants to visit and terminal access privileges corresponding to the webpage from the privilege control unit 120.

Then, the browser execution unit 140 may check whether a browser process having the corresponding terminal access privileges exists in the system. That is, the browser execution unit 140 may check whether a browser process having the corresponding terminal access privileges is being executed in the browser.

Here, the browser execution unit 140 may check whether the browser process is being executed by sending a query that includes the corresponding terminal access privileges to the terminal control unit 150, illustrated in FIG. 1.

In this case, if there is a browser process having the corresponding terminal access privileges, the terminal control unit 150 may send the identifier of the corresponding browser process to the browser execution unit 140. Here, the identifier of the browser process may be a Process Identifier (PID) in a Unix-like system.

Conversely, if there is no browser process having the corresponding terminal access privileges, the browser execution unit 140 may create a new browser process having the corresponding terminal access privileges.

Then, the browser process 171, which has already been executed or has newly been created, renders the website that the user wants to visit. Here, the renderer process 172 of the browser process 171 configures the browser 170, along with the browser process 171, and may perform all operations that are necessary for rendering a webpage, such as parsing HTML documents and CSS documents, parsing and executing JavaScript, decoding images, and the like.

In this case, as shown in FIG. 3, the browser process 171 or the renderer process 172 asks the privilege control unit 120 about terminal access privileges that are necessary in order to download the requested web resources, and may obtain permission depending on the determination by the privilege control unit 120.

In other words, the privilege control unit 120 checks whether the terminal access privileges of the browser process 171 are the same as the terminal access privileges requested by the browser process 171 or the renderer process 172, and permits downloading of the web resources only when the two terminal access privileges are the same as each other.

However, if the browser process 171 or the renderer process 172 attempts to download the web resources but downloading is not permitted, the address of the web resources and the terminal access privileges suitable for the web resources are delivered to the browser execution unit 140, and thus a new browser process for downloading the web resources may be executed.

In this case, because a great number of web resources may be requested by a single webpage and multiple browser processes may simultaneously request web resources, the privilege control unit 120 may implement a queue therein in order to store web resources, that is, the addresses of web pages.

Figure 4:
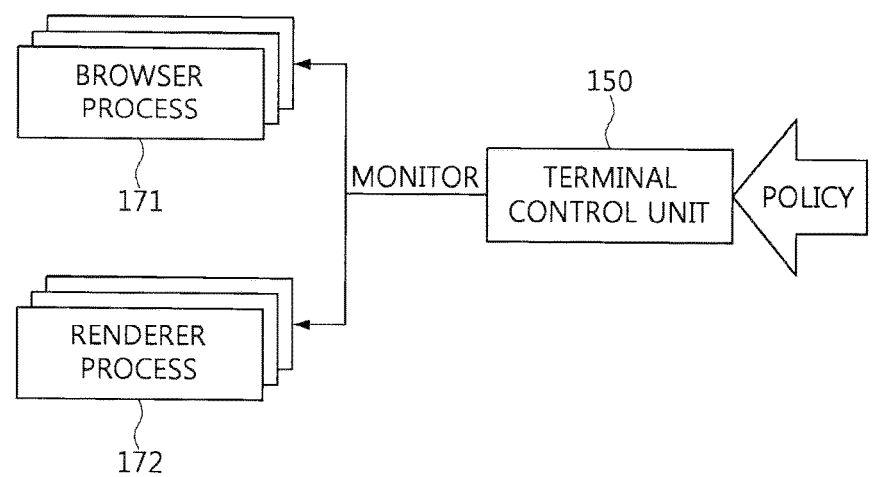
FIG. 4 is a block diagram illustrating an example of the relationship between the terminal control unit, the browser process, and the renderer process, illustrated in FIG. 1.

FIG. 4 is a block diagram illustrating an example of the relationship between the terminal control unit, the browser process, and the renderer process, illustrated in FIG. 1.

Referring to FIG. 4, the terminal control unit 150 receives a policy for controlling access to the resources in the terminal based on each set of terminal access privileges, and may apply the received policy to a system.

Here, the policy may be input in various forms such as XML, JSON, and or like, from a user or a management server.

In the present embodiment with reference to FIG. 4, an example in which the policy is input from the management server is depicted, and the policy input from the management server may be transmitted after being encrypted or signed for security.

Accordingly, the terminal control unit 150 monitors the browser processes 171 and the renderer processes 172 in real time, and thereby may detect and prevent alteration of privileges or an access attempt that violates the policy.

Here, the terminal resources to which access can be controlled based on terminal access privileges through the policy may include a file system, a system call provided by an operating system, a removable memory device, an input device including a camera and a printer, a GPS device, a screen capture function, a clipboard function, a plug-in, and a function of executing a third-party application.

Figure 5:
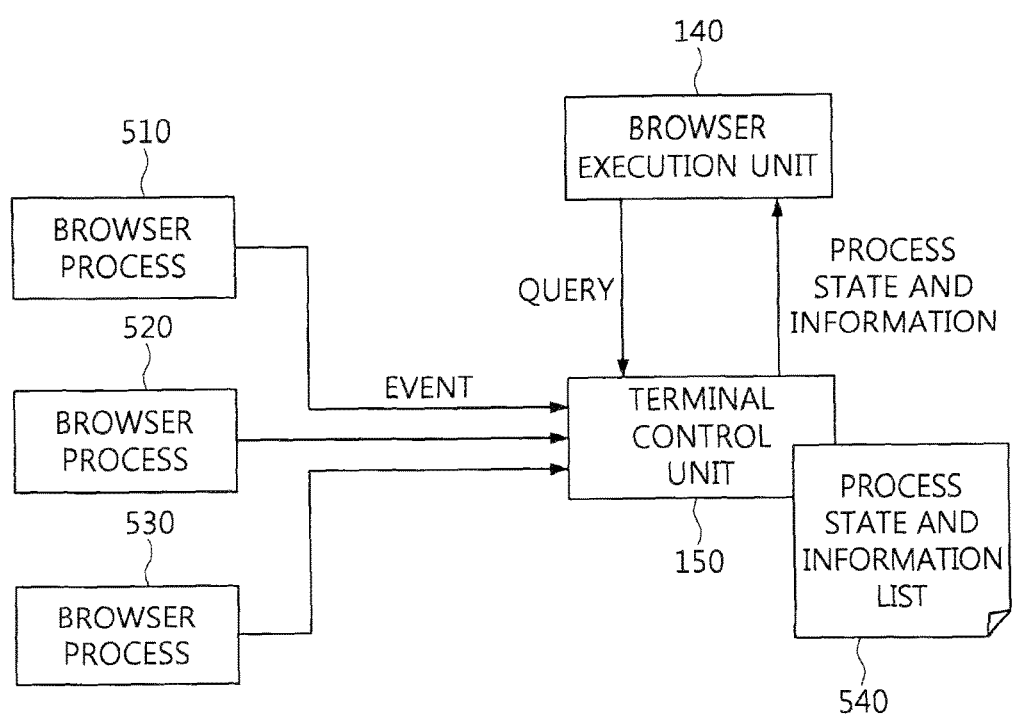
FIG. 5 is a block diagram illustrating an example of the relationship between the terminal control unit and the browser execution unit, illustrated in FIG. 1.

FIG. 5 is a block diagram illustrating an example of the relationship between the terminal control unit and the browser execution unit, illustrated in FIG. 1.

Referring to FIG. 5, the terminal control unit 150 may detect events such as execution, normal termination, and abnormal termination of browser processes 510, 520, and 530.

Here, a process state and information list 540 corresponding to the browser processes 510, 520, and 530 is created based on the detected events, and information about the state of all of the browser processes 510, 520, and 530 may be kept up-to-date.

Here, if the terminal control unit 150 receives a query for checking whether there is a process having certain terminal access privileges from the browser execution unit 140, it may provide information about the state of a process having the corresponding terminal access privileges with reference to the process state and information list 540.

Figure 6:
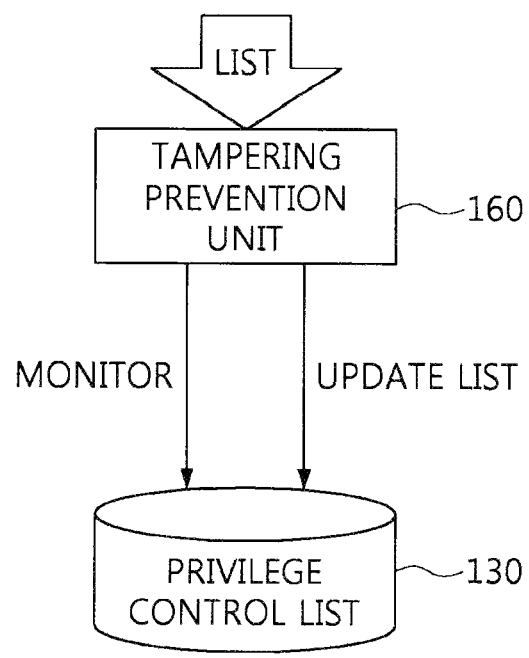
FIG. 6 is a block diagram illustrating an example of the relationship between the tampering prevention unit and the privilege control list, illustrated in FIG. 1.

FIG. 6 is a block diagram illustrating an example of the relationship between the tampering prevention unit and the privilege control list, illustrated in FIG. 1.

Referring to FIG. 6, in order to retain the data structure in the privilege control list 130, the privilege control list 130 may receive a list in which terminal access privileges are set based on a combination of detailed items of an address of a webpage via the tampering prevention unit 160.

Here, the list may be directly input from a user or a management server, but the present embodiment illustrates an example in which the list is input from the management server via the tampering prevention unit 160.

Because the privilege control list 130 receives the list via the tampering prevention unit 160, whether or not the privilege control list 130 is falsified may be checked by periodically comparing the list stored in the internal storage module of the tampering prevention unit 160 with the privilege control list 130.

Specifically, the tampering prevention unit 160 periodically monitors the privilege control list 130. If an unapproved attempt to alter the privilege control list 130 is detected even though no list has been delivered from the management server, the corresponding attempt may be blocked by the tampering prevention unit 160.

Here, the management server needs to send the list, which has necessarily been signed, and the tampering prevention unit 160 may send the received list to the privilege control list 130 after authenticating the signature of the list.

Figure 7:
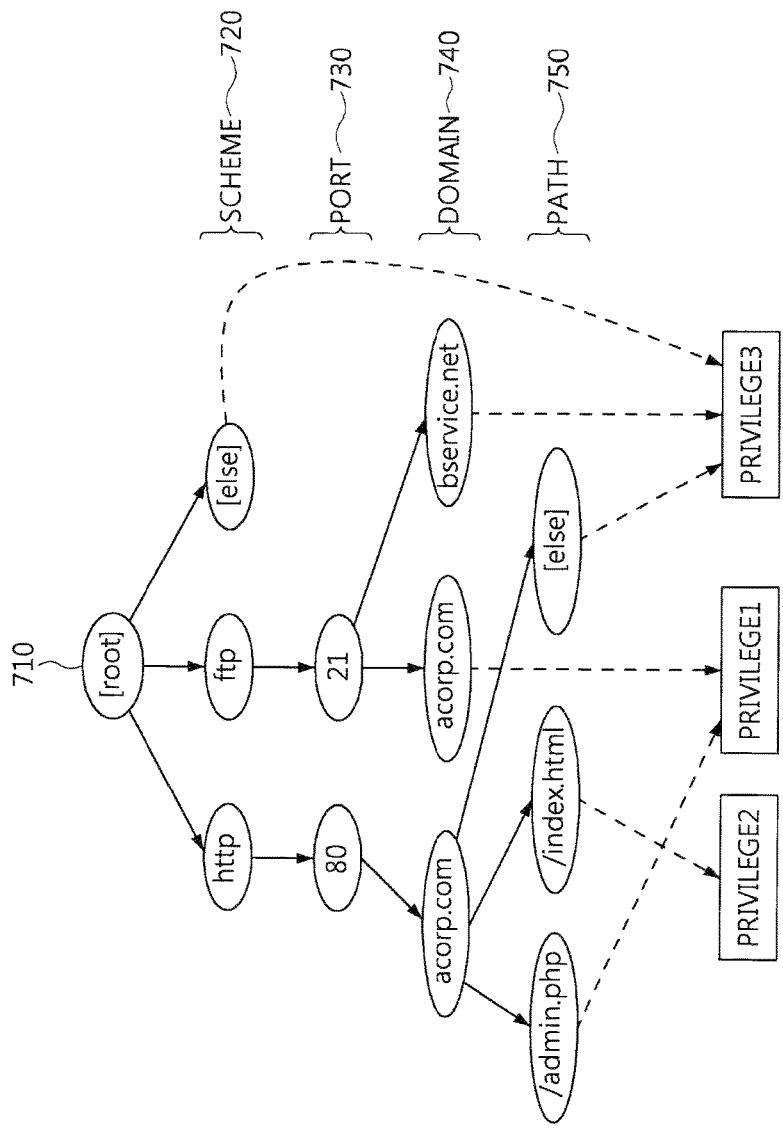
FIG. 7 is a view illustrating a data structure for enabling the privilege control unit to process a query according to an embodiment of the present invention.

FIG. 7 is a view illustrating a data structure that is necessary in order for the privilege control list to process a query according to an embodiment of the present invention.

Referring to FIG. 7, the privilege control list according to an embodiment of the present invention may search for suitable terminal access privileges through various methods using the scheme, domain name, port number, path, file name, and the like, which are included in the query received from the privilege control unit.

The embodiment illustrated in FIG. 7 shows a search method using a tree structure.

Here, the tree may be configured to have a hierarchical structure.

First, a scheme 720 that is identical to the scheme included in the query may be searched for by traversing child nodes of the root node 710.

Then, if an identical scheme 720 is found in the tree, a port 730 that is identical to the port included in the query may be searched for by traversing child nodes of the corresponding node.

Then, through the same method, a domain 740 and a path 750 may be sequentially searched for.

When reaching a leaf node having no child node, terminal access privileges associated with the corresponding node may be acquired as the terminal access privileges to be granted to the address included in the query.

Figure 8:
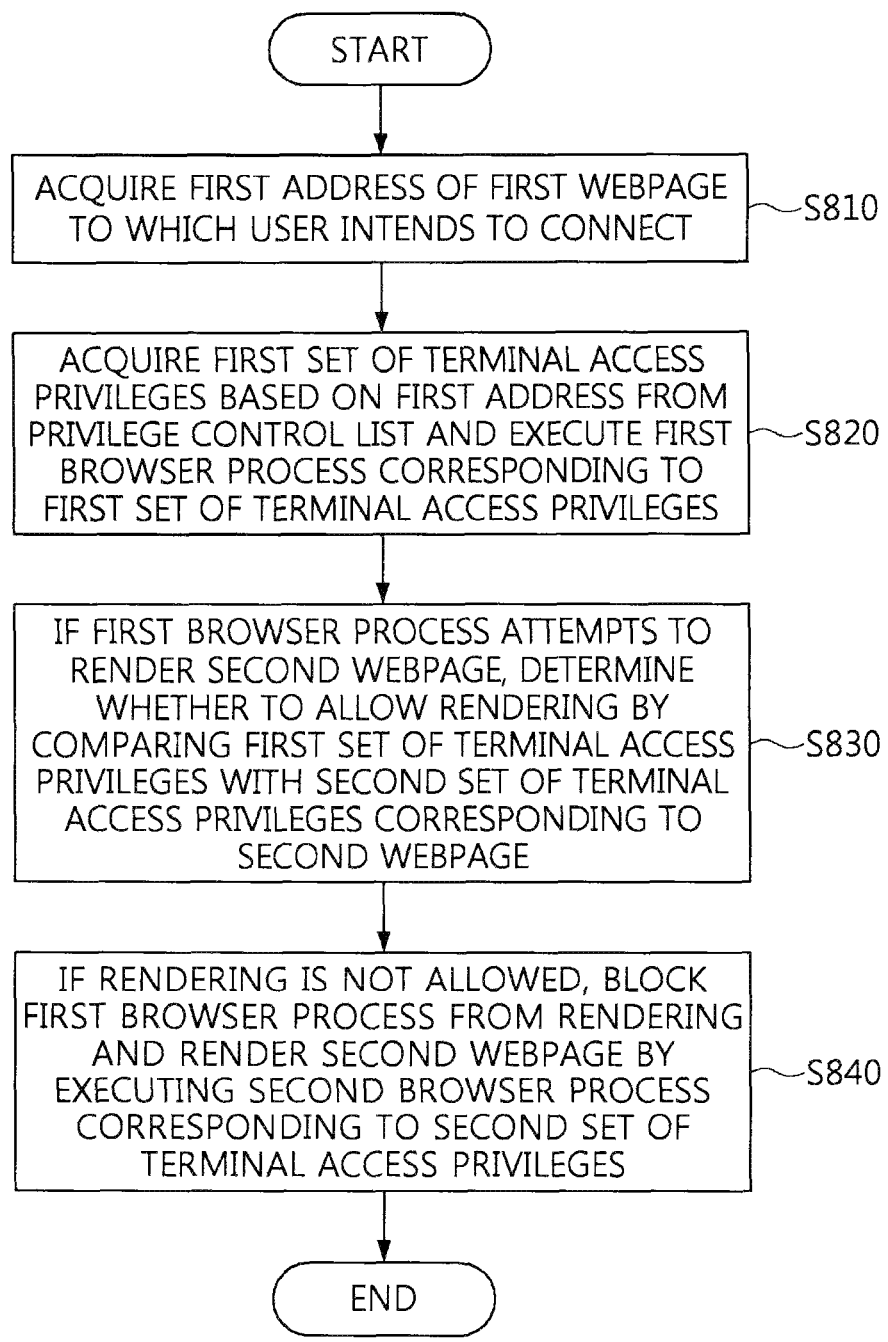
FIG. 8 is a flowchart illustrating a method for providing a browser using browser processes separated based on access privileges according to an embodiment of the present invention.

FIG. 8 is a flowchart illustrating a method for providing a browser using browser processes separated based on access privileges according to an embodiment of the present invention.

Referring to FIG. 8, in the method for providing a browser using browser processes separated based on access privileges according to an embodiment of the present invention, a first address, which is the address of a first webpage to which the user of a terminal intends to connect, is acquired at step S810. For example, an address that includes a scheme such as http or ftp, a port number, a domain name, a path, a file name, and the like may be acquired.

Here, the acquired address of the webpage may be used in order to determine terminal access privileges corresponding to the webpage.

Here, the first address may be acquired using at least one of a method in which the first address that a user enters in the address field of a web browser is acquired and a method in which the first address is acquired from a web resource, clicked by a user, in the file system.

That is, both the address that a user directly enters in the address field of the web browser and the address of the web resource accessed by a user in the file system may be included in the scope of an acquirable address.

Also, in the method for providing a browser using browser processes separated based on access privileges according to an embodiment of the present invention, a first set of terminal access privileges corresponding to a first webpage is acquired based on the first address, and a first browser process corresponding to the first set of terminal access privileges is executed at step S820. That is, suitable terminal access privileges to be granted to the first address may be determined, and a privilege control list may be referred to for the determination.

Here, the privilege control list may be a database in which terminal access privileges are set based on an address of a website.

Accordingly, when the first address is sent to the privilege control list, the first set of terminal access privileges corresponding to the first address may be retrieved from the database corresponding to the privilege control list and be provided.

Here, the terminal access privileges may correspond to a User Identifier (UID) format. A UID is an identifier for identifying a user or process that accesses resources such as files in a Unix-like system. However, in the present invention, another identifier that may distinguish processes may be substituted for the UID.

Here, the first address is divided into detailed items corresponding to at least one of a scheme, a domain name, a port number, a path, and a file name, and a query that includes the detailed items is delivered to the privilege control list, whereby the first set of terminal access privileges corresponding to a UID format may be acquired.

Here, the privilege control list may be searched for terminal access privileges suitable for the first address through various methods using the scheme, domain name, port number, path, and file name, which are included in the query.

For example, in order to process a query in the privilege control list, terminal access privileges may be retained in the form of a data structure therein. In this case, when the privilege control list receives a query, the data structure is traversed based on the detailed items included in the query, and thereby suitable terminal access privileges may be searched for.

Here, in order to connect to the first address, the first browser process corresponding to the first set of terminal access privileges is executed first, and a connection to the first webpage is made by entering the first address in the first browser process.

Also, in the method for providing a browser using browser processes separated based on access privileges according to an embodiment of the present invention, when the first browser process attempts to render a second webpage, whether to allow rendering is determined at step S830 by comparing the first set of terminal access privileges with a second set of terminal access privileges corresponding to the second webpage.

Here, if the first set of terminal access privileges is not the same as the second set of terminal access privileges, rendering may not be permitted. That is, because the first browser process has the first set of terminal access privileges, the first browser process is permitted to render only webpages having a set of terminal access privileges that is the same as the first set of terminal access privileges.

Also, in the method for providing a browser using browser processes separated based on access privileges according to an embodiment of the present invention, if the first browser is not permitted to render the second webpage, the first browser is blocked from performing the rendering, and the second webpage is rendered by executing a second browser process corresponding to the second set of terminal access privileges at step S840.

Here, if rendering is permitted because the first set of terminal access privileges is the same as the second set of terminal access privileges, the second webpage may be rendered using any one of the first browser process and a first renderer process corresponding to the first browser process. That is, if the first set of terminal access privileges is the same as the second set of terminal access privileges, the second webpage may be accessed by entering the second address regardless of which to use the first browser process or the first renderer process.

Here, the renderer process configures a browser, along with the browser process, and may perform all operations that are necessary for rendering a webpage, such as parsing HTML documents and CSS documents, parsing and executing JavaScript, decoding images, and the like.

Accordingly, in order for the first renderer process to render the second webpage, the first renderer process also needs to obtain permission from the privilege control unit.

For example, if the first renderer process attempts to download web resources such as HTML documents, CSS documents, images, JavaScript, and the like while rendering the second webpage, the first renderer process may download the web resources only after obtaining permission from the privilege control unit 120 based on the second set of terminal access privileges corresponding to the second webpage.

As another example, when a user clicks a link in the first webpage, the first browser process may also attempt to download web resources connected to the clicked link, that is, may attempt to render the second webpage. In this case, the first browser process may perform rendering only after obtaining permission from the privilege control list 120 based on the second set of terminal access privileges corresponding to the second webpage. If this permission is not obtained, the second webpage may be rendered by another browser process having the second set of terminal access privileges.

Here, before executing the second browser process, it is determined whether a third browser process having the second set of terminal access privileges is being executed, and if such a third browser process is being executed, the second webpage may be rendered using the third browser process rather than by executing the second browser process.

For example, it may be assumed that the first browser process, having the first set of terminal access privileges, and the third browser process, having the second set of terminal access privileges that is not the same as the first set of terminal access privileges, are currently being executed in the system. In this case, if the first browser process attempts to render the second webpage having the second set of terminal access privileges, the attempt at rendering by the first browser is blocked, and then the address of the second webpage and the second set of terminal access privileges may be sent to the browser execution unit, which serves to execute a browser. Then, the second webpage may be rendered using the third browser process, which has already been executed.

Also, in the above example, if only the first browser process having the first set of terminal access privileges is currently being executed in the system, the second webpage may be rendered by executing the second or third browser process corresponding to the second set of terminal access privileges.

Here, the terms "first", "second", "third", and the like are used merely in order to distinguish the browser processes executed in the system from each other.

Here, if the identifier of the browser process corresponding to the second set of terminal access privileges is confirmed by the terminal control module, which manages the states of all browser processes, it may be determined that a third browser process exists.

For example, in order to check whether there is a third browser process corresponding to the second set of terminal access privileges, a query that includes the second set of terminal access privileges may be sent to the terminal control module. Here, the terminal control module may acquire information about the second set of terminal access privileges from the query and check the state of the browser process having the second set of terminal access privileges in the process state and information list. Here, if it is determined that a third browser process, having the second set of terminal access privileges, is being executed, the identifier of the third browser process is delivered to the browser execution unit so as to indicate that the third process is being executed.

Also, in the above example, if no browser process having the second set of terminal access privileges is executed, the terminal control module may provide the browser execution unit with state information indicating that no browser process having the second set of terminal access privileges is being executed. Then, based on the information received from the terminal control module, a browser process having the second set of terminal access privileges may be executed.

Here, the terminal control module may manage and retain the states of all browser processes in real time. In this case, "all browser processes" may mean the browser processes being executed in the browser, that is, the browsing application, and executable browser processes.

Here, the terminal control module may keep the state information of all the browser processes up to date by detecting events such as execution, normal termination, and abnormal termination of browser processes executed in the browser.

Here, the terminal control module may retain information about at least one of a process identifier and terminal access privileges, which correspond to each of all the browser processes, in real time, and may provide the information about a browser process having certain terminal access privileges.

Also, although not illustrated in FIG. 8, in the method for providing a browser using browser processes separated based on access privileges according to an embodiment of the present invention, the terminal control module monitors at least one of all browser processes and renderer processes corresponding to all the browser processes based on at least one of terminal access privileges included in the privilege control list and a policy that specifies access rules corresponding to terminal resources, and may block at least one of unintended escalation of process privileges and an attempt to access terminal resources, which violates the policy.

Here, the policy may be a policy for controlling access to the resources in the terminal based on respective terminal access privileges. In other words, the terminal control module receives an access control policy corresponding to the terminal resources based on respective terminal access privileges, and may apply the policy to a browser provision system according to the present invention.

Here, the terminal control module may be input in various forms, such as eXtensible Markup Language (XML), JavaScript Object Notation (JSON), or the like, from a user or a management server. Also, the terminal control module may receive a policy that is encrypted or signed for security.

Here, the terminal resources to which access can be controlled based on terminal access privileges through the policy may include at least one of a file system, a system call provided by an operating system, a removable memory device, an input device including a camera and a printer, a GPS device, a screen capture function, a clipboard function, a plug-in, and a function of executing a third-party application.

Also, although not illustrated in FIG. 8, in the method for providing a browser using browser processes separated based on access privileges according to an embodiment of the present invention, whether the privilege control list has corrupted or falsified may be checked through a periodic check process.

Also, although not illustrated in FIG. 8, in the method for providing a browser using browser processes separated based on access privileges according to an embodiment of the present invention, the privilege control list may be created by acquiring a list, in which respective terminal access privileges are set based on a combination of detailed items, from the management server.

Here, a tampering prevention module separately stores the list in the internal storage module thereof, and may prevent the falsification of the privilege control list by monitoring it based on the separately stored list.

For example, assuming that the interval for checking is set to time t, whenever an amount of time corresponding to t elapses, whether the privilege control list is falsified may be checked by comparing the privilege control list with the list stored in the internal storage module of the tampering prevention module. If an attempt to make an unapproved change to the list is detected in the privilege control list, the attempt may be blocked.

Here, authentication is performed based on the signature included in the list, and if the authentication succeeds, the list is processed so as to form a data structure, whereby the privilege control list may be created.

Also, although not illustrated in FIG. 8, in the method for providing a browser using browser processes separated based on access privileges according to an embodiment of the present invention, the privilege control list may be updated by acquiring a new list, in which respective terminal access privileges are changed, from the management server.

As described above, because a browser is provided to a user through the browser provision method according to the present invention, browser processes are separated, thus preventing a web attack on the entire browser. Also, even if a certain browser process is infected with malware, the damage may be prevented from spreading to other browser processes.

Also, terminal access control is performed for each webpage by granting a different set of terminal access privileges to each of the browser processes, whereby damage caused by a privilege escalation attack of malware may be prevented.

Figure 9:
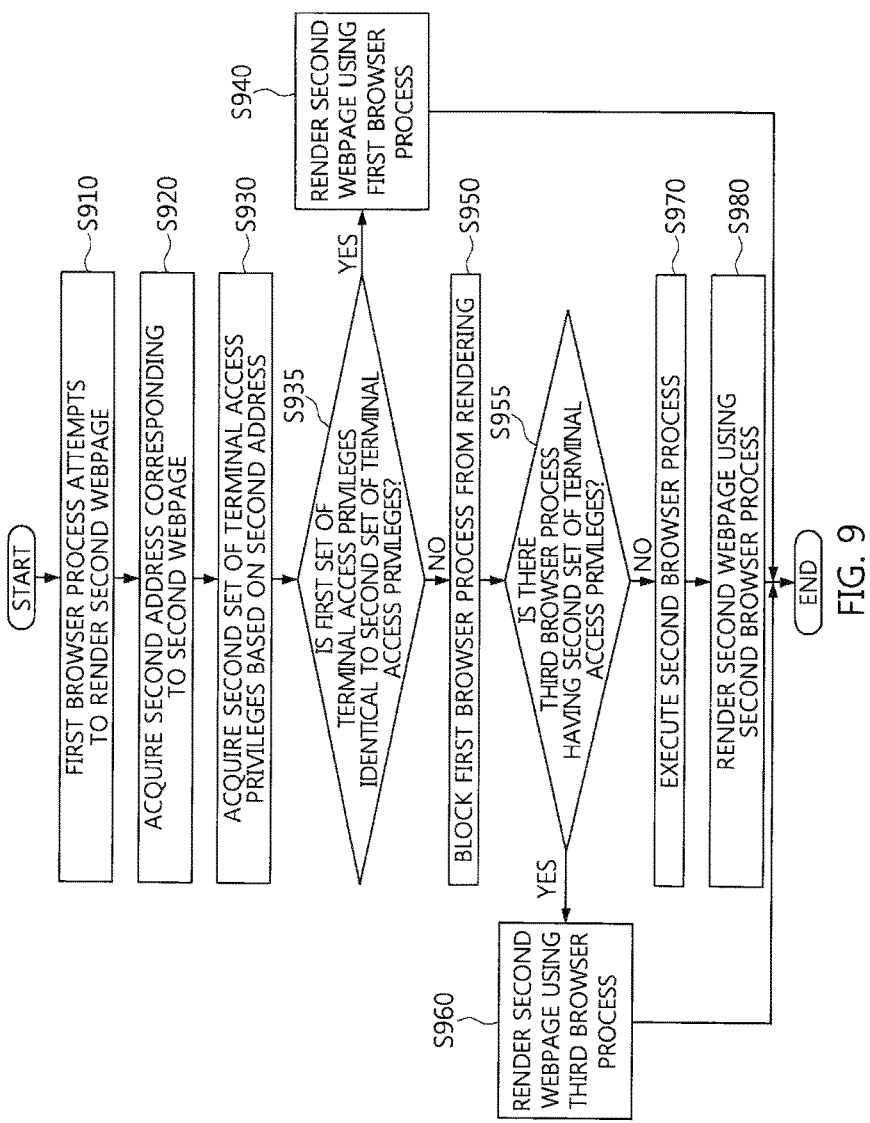
FIG. 9 is a flowchart illustrating the process of rendering the second webpage based on terminal access privileges in the method for providing a browser according to the present invention.

FIG. 9 is a flowchart specifically illustrating a process of rendering a second webpage based on terminal access privileges in the browser provision method according to the present invention.

Referring to FIG. 9, in the process of rendering a second webpage based on terminal access privileges in the browser provision method according to the present invention, the first browser process having the first set of terminal access privileges may attempt to render the second webpage at step S910.

Then, the second address, which is the address of the second webpage, may be acquired in order to determine the terminal access privileges of the second webpage at step S920.

Then, based on the second address, the second set of terminal access privileges corresponding to the second webpage may be acquired from the privilege control list at step S930.

Then, whether the first set of terminal access privileges is the same as the second set of terminal access privileges may be determined at step S935.

If it is determined at step S935 that the first set of terminal access privileges is the same as the second set of terminal access privileges, the second webpage may be rendered using the first browser process at step S940.

Conversely, if it is determined at step S935 that the first set of terminal access privileges is not the same as the second set of terminal access privileges, the first browser process may be blocked from rendering the second webpage at step S950.

Then, it may be determined at step S955 whether a third browser process having the second set of terminal access privileges exists in the system.

Here, whether such a third process exists may be determined by sending a query that includes the second set of terminal access privileges to the terminal control unit.

Here, if the identifier of the third browser process is received from the terminal control unit in response to the query, it may be determined that the third browser process exists.

If it is determined at step S955 that the third browser process exists, the second webpage may be rendered using the third browser process at step S960.

Conversely, if it is determined at step S955 that the third browser process does not exist, a second browser process having the second set of terminal access privileges may be executed by the browser execution unit at step S970.

Then, the second webpage may be rendered using the second browser process at step S980.

According to the present invention, terminal access privileges are granted to respective websites, and a browser process is created based on the privileges, whereby terminal access control may be performed for each website.

Also, the present invention performs terminal access control for respective webpages by granting a different set of terminal access privileges to each browser process, and may prevent damage caused by a privilege escalation attack of malware.

Also, in the present invention, web pages having different terminal access privileges are accessed using different browser processes, whereby almost all web attacks, including Reflected XSS, Click-Jacking, and CSRF, may be prevented. Also, even when a certain browser process crashes, the damage may be prevented from spreading to other processes.

As described above, the browser provision method using browser processes separated based on access privileges and the apparatus using the method according to the present invention are not limitedly applied to the configurations and operations of the above-described embodiments, but all or some of the embodiments may be selectively combined and configured so that the embodiments may be modified in various ways.

What is claimed is:

1. A method for providing a browser using browser processes separated based on access privileges, comprising:
   acquiring a first address corresponding to a first webpage to which a user of a terminal intends to connect;
   acquiring a first set of terminal access privileges corresponding to the first webpage based on the first address from a privilege control list, and executing a first browser process corresponding to the first set of terminal access privileges;
   determining whether to allow rendering by comparing the first set of terminal access privileges with a second set of terminal access privileges corresponding to a second webpage when the first browser process attempts to render the second webpage; and
   when the rendering is not allowed, blocking the first browser process from rendering and rendering the second webpage by executing a second browser process corresponding to the second set of terminal access privileges.

2. The method of claim 1, wherein determining whether to allow the rendering is configured not to allow the rendering when the first set of terminal access privileges is not identical to the second set of terminal access privileges.

3. The method of claim 2, wherein rendering the second webpage is configured to render the second webpage using at least one of the first browser process and a first renderer process corresponding to the first browser process when the rendering is allowed because the first set of terminal access privileges is identical to the second set of terminal access privileges.

4. The method of claim 1, wherein rendering the second webpage comprises:
   determining whether there is a third browser process that is being executed to correspond to the second set of terminal access privileges before executing the second browser process; and
   when there is the third browser process, rendering the second webpage using the third browser process rather than by executing the second browser process.

5. The method of claim 4, wherein determining whether there is the third browser process is configured to determine that there is the third browser process when an identifier of a browser process corresponding to the second set of terminal access privileges is confirmed by a terminal control module, which manages states of all browser processes.

6. The method of claim 5, further comprising,
   monitoring, by the terminal control module, at least one of all the browser processes and renderer processes corresponding to all the browser processes based on at least one of the terminal access privileges included in the privilege control list and a policy in which an access rule corresponding to a resource of the terminal is specified; and
   blocking, by the terminal control module, at least one of unintended process privilege escalation and an attempt to access the resource of the terminal, which violates the policy, through the monitoring.

7. The method of claim 6, wherein the terminal control module is configured to:
   keep at least one piece of information between a process identifier and terminal access privileges, which correspond to each of all the browser processes, up-to-date; and
   provide information about a browser process having certain terminal access privileges.

8. The method of claim 1, wherein executing the first browser process comprises:
   dividing the first address into detailed items corresponding to at least one of a scheme, a domain name, a port number, a path, and a file name; and
   acquiring the first set of terminal access privileges corresponding to a User Identifier (UID) format by sending a query that includes the detailed items to the privilege control list.

9. The method of claim 8, further comprising,
   creating the privilege control list by acquiring a list, in which each set of the terminal access privileges is set based on a combination of the detailed items, from a management server.

10. The method of claim 9, further comprising,
    updating the privilege control list by acquiring a new list, in which each set of the terminal access privileges is changed, from the management server.

11. The method of claim 10, further comprising,
    storing the new list in a tampering prevention module and preventing falsification of the privilege control list by monitoring the privilege control list based on the new list stored in the tampering prevention module.

12. The method of claim 9, wherein creating the privilege control list is configured to:
    perform authentication based on a signature included in the list; and create the privilege control list by processing the list in a form of a data structure when the authentication succeeds.

13. The method of claim 1, wherein acquiring the first address is configured to acquire the first address using at least one of a method in which the first address that the user enters in an address field of a web browser is acquired and a method in which the first address is acquired from a web resource clicked by the user in a file system.

* * * * *